United States Patent
Yiu et al.

(10) Patent No.: US 9,721,911 B2
(45) Date of Patent: *Aug. 1, 2017

(54) CHIP PACKAGE AND MANUFACTURING METHOD THEREOF

(71) Applicant: XINTEC INC., Taoyuan (TW)

(72) Inventors: Ho-Yin Yiu, Hsinchu (TW); Ying-Nan Wen, Hsinchu (TW); Chien-Hung Liu, New Taipei (TW); Shih-Yi Lee, Taoyuan (TW)

(73) Assignee: XINTEC INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,633

(22) Filed: Nov. 3, 2015

(65) Prior Publication Data

US 2016/0133588 A1    May 12, 2016

Related U.S. Application Data

(60) Provisional application No. 62/078,882, filed on Nov. 12, 2014.

(51) Int. Cl.
*H01L 23/48* (2006.01)
*H01L 23/00* (2006.01)
(Continued)

(52) U.S. Cl.
CPC ............ *H01L 24/09* (2013.01); *G06F 21/32* (2013.01); *H01L 21/02013* (2013.01); *H01L 21/31* (2013.01); *H01L 21/31111* (2013.01); *H01L 21/6835* (2013.01); *H01L 21/78* (2013.01); *H01L 24/03* (2013.01); *H01L 24/11* (2013.01); *H01L 24/17* (2013.01); *H01L 23/525* (2013.01); *H01L 2221/6834* (2013.01); *H01L 2221/68327* (2013.01); *H01L 2224/02311* (2013.01);
(Continued)

(58) Field of Classification Search
CPC ...................................................... H01L 24/09
USPC ........................................................ 257/737
See application file for complete search history.

(56) References Cited

U.S. PATENT DOCUMENTS

2005/0104228 A1* 5/2005 Rigg ................. H01L 21/76898
257/786
2010/0140805 A1* 6/2010 Chang ................. H01L 21/6835
257/773

(Continued)

FOREIGN PATENT DOCUMENTS

TW     201131724     9/2011
TW     201232684     8/2012

*Primary Examiner* — Long K Tran
(74) *Attorney, Agent, or Firm* — Liu & Liu (57) ABSTRACT

A chip package includes a chip, a laser stopper, an isolation layer, a redistribution layer, an insulating layer, and a conductive structure. The chip has a conductive pad, a first surface, and a second surface. The conductive pad is located on the first surface. The second surface has a first through hole to expose the conductive pad. The laser stopper is located on the conductive pad in the first through hole. The isolation layer is located on the second surface and in the first through hole. The isolation layer has a third surface opposite to the second surface, and has a second through hole to expose the laser stopper. The redistribution layer is located on the third surface, a sidewall of the second through hole, and the laser stopper in the second through hole. The conductive structure is located on the redistribution.

22 Claims, 7 Drawing Sheets

(51) Int. Cl.
- *H01L 21/683* (2006.01)
- *H01L 21/31* (2006.01)
- *H01L 21/311* (2006.01)
- *H01L 21/78* (2006.01)
- *H01L 21/02* (2006.01)
- *G06F 21/32* (2013.01)
- *H01L 23/525* (2006.01)

(52) U.S. Cl.
CPC ............... *H01L 2224/02372* (2013.01); *H01L 2224/02381* (2013.01); *H01L 2224/03002* (2013.01); *H01L 2224/03462* (2013.01); *H01L 2224/08235* (2013.01); *H01L 2224/08237* (2013.01); *H01L 2224/16235* (2013.01); *H01L 2224/16237* (2013.01)

(56) References Cited

U.S. PATENT DOCUMENTS

2011/0068466 A1* 3/2011 Chen ................. H01L 21/76898
 257/737
2016/0133544 A1* 5/2016 Liu ....................... H01L 23/481
 257/774

\* cited by examiner

| A wafer and a support element that is temporarily bonded to the wafer are provided. The wafer has a conductive pad, a first surface, and a second surface opposite to the first surface, and the conductive pad is located on the first surface, and the support element covers the first surface and the conductive pad | ⎯ S1 |

| A first though hole is formed in the second surface of the wafer, such that the conductive pad is exposed through the first though hole | ⎯ S2 |

| A laser stopper is electroplated on the conductive pad that is in the first though hole | ⎯ S3 |

| An isolation layer is formed on the second surface of the wafer and in the first though hole. The isolation layer has a third surface opposite to the second surface | ⎯ S4 |

| A laser is used to penetrate the isolation layer and form a second though hole. The laser is shielded by the laser stopper, and the laser stopper is exposed through the second though hole | ⎯ S5 |

| A redistribution layer is electroplated on the third surface of the isolation layer, the sidewall of the second though hole, and the laser stopper that is in the second though hole | ⎯ S6 |

CHIP PACKAGE AND MANUFACTURING METHOD THEREOF

RELATED APPLICATIONS

This application claims priority to U.S. provisional Application Ser. No. 62/078,882, filed Nov. 12, 2014, which is herein incorporated by reference.

BACKGROUND

Field of Invention

The present invention relates to a chip package and a manufacturing method of the chip package.

Description of Related Art

A finger print sensor or an RF sensor needs a flat sensing surface to detect signals. The flatness of a sensing surface directly affects the detecting accuracy of the sensor. For example, it is difficult to completely detect a fingerprint for a sensor that has an uneven sensing surface for finger pressing.

Furthermore, in the manufacture of the sensor, a through silicon via (TSV) is first formed in a wafer to expose a conductive pad of the wafer. Thereafter, a chemical vapor deposition (CVD) process is performed on the conductive pad and the sidewall of the through silicon via to form an isolation layer. Further, a patterning process is performed to form an opening in the isolation layer that is over the conductive pad. In general, the patterning process includes exposure, development, and etching processes. Subsequently, a redistribution layer can be formed on the isolation layer and electrically connected to the conductive pad that is in the opening of the isolation layer.

However, both the chemical vapor deposition and the patterning processes are time-consuming and at the substantial costs of equipments.

SUMMARY

An aspect of the present invention is to provide a chip package.

According to an embodiment of the present invention, a chip package includes a chip, a laser stopper, an isolation layer, a redistribution layer, an insulating layer, and a conductive structure. The chip has a conductive pad, a first surface, and a second surface opposite to the first surface. The conductive pad is located on the first surface, and the second surface has a first through hole to expose the conductive pad. The laser stopper is located on the conductive pad that is in the first through hole. The isolation layer is located on the second surface and in the first through hole. The isolation layer has a third surface opposite to the second surface, and has a second through hole to expose the laser stopper. The redistribution layer is located on the third surface, the sidewall of the second through hole, and the laser stopper that is in the second through hole. The insulating layer is located on the third surface and the redistribution layer. The insulating layer has an opening to expose the redistribution layer. The conductive structure is located on the redistribution layer that is in the opening of the insulating layer, such that the conductive structure is electrically connected to the conductive pad.

Another aspect of the present invention is to provide a manufacturing method of a chip package.

According to an embodiment of the present invention, a manufacturing method of a chip package includes the following steps. (a) A wafer and a support element that is temporarily bonded to the wafer are provided. The wafer has a conductive pad, a first surface, and a second surface opposite to the first surface, and the conductive pad is located on the first surface, and the support element covers the first surface and the conductive pad. (b) A first through hole is formed in the second surface of the wafer, such that the conductive pad is exposed through the first through hole. (c) A laser stopper is electroplated on the conductive pad that is in the first through hole. (d) An isolation layer is formed on the second surface of the wafer and in the first through hole. The isolation layer has a third surface opposite to the second surface. (e) A laser is used to penetrate the isolation layer and form a second through hole. The laser is shielded by the laser stopper, and the laser stopper is exposed through the second through hole. (f) A redistribution layer is electroplated on the third surface of the isolation layer, the sidewall of the second through hole, and the laser stopper that is in the second through hole.

In the aforementioned embodiments of the present invention, the laser stopper is located on the conductive pad that is in the first through hole. Hence, when a laser penetrates the isolation layer, the laser can be shielded by the laser stopper, and the second through hole exposing the laser stopper is formed in the isolation layer. After the second through hole is formed, the redistribution layer can be electroplated on the third surface of the isolation layer, the sidewall of the second through hole, and the laser stopper that is in the second through hole, such that the redistribution layer can be electrically connected to the conductive pad through the laser stopper. The chip package and the manufacturing method thereof in the present invention can omit a typical chemical vapor deposition (CVD) process and a typical pattering process for the isolation layer, thereby saving process time and reducing the cost of equipments. Moreover, no additional process is performed on the first surface of the chip, so that the flatness of the first surface of the chip is good, and the detecting accuracy of the chip package can be improved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
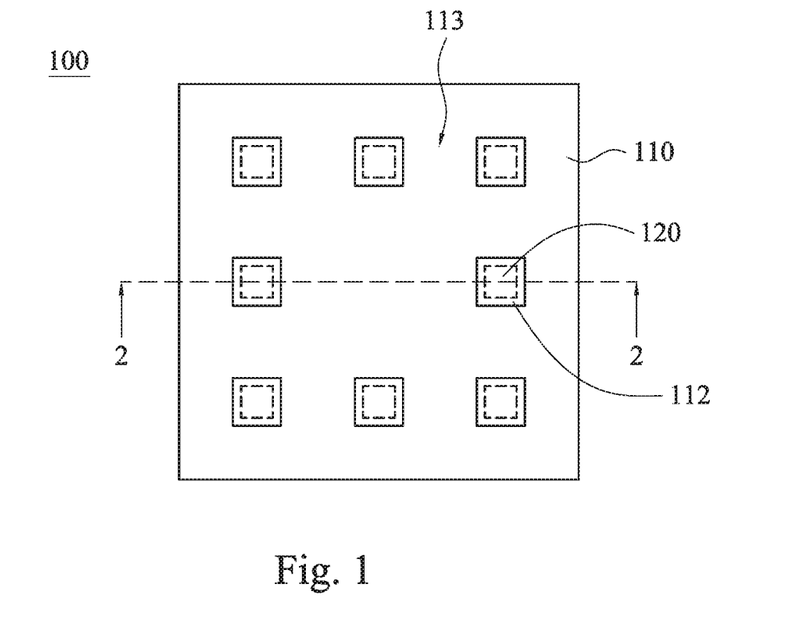
FIG. 1 is a top view of a chip package according to one embodiment of the present invention.
Figure 2:
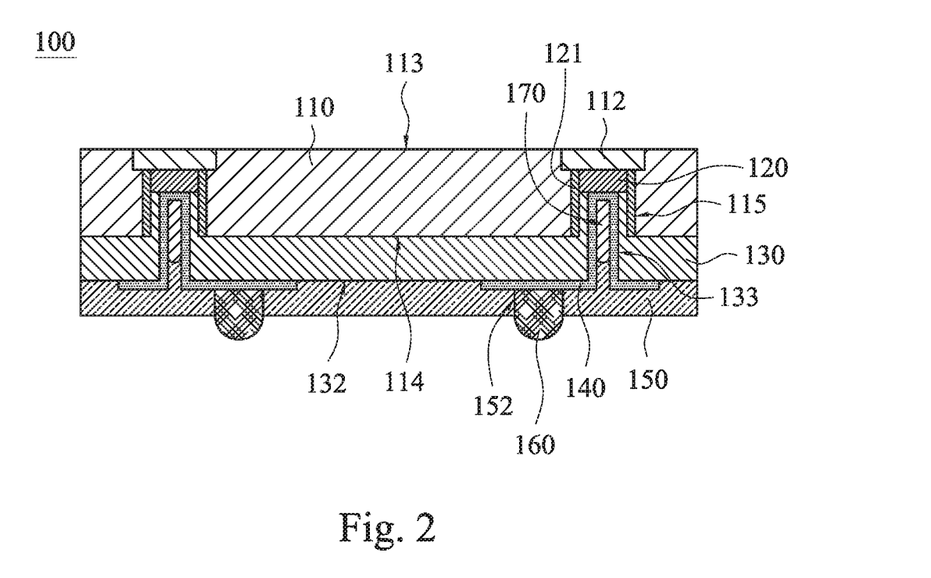
FIG. 2 is a cross-sectional view of the chip package taken along line 2-2 shown in FIG. 1.

FIG. 1 is a top view of a chip package 100 according to one embodiment of the present invention. FIG. 2 is a cross-sectional view of the chip package 100 taken along line 2-2 shown in FIG. 1. As shown in FIG. 1 and FIG. 2, the chip package 100 includes a chip 110, a laser stopper 120, an isolation layer 130, a redistribution layer 140 (RDL), an insulating layer 150, and a conductive structure 160. The chip 110 has a conductive pad 112, a first surface 113, and a second surface 114 opposite to the first surface 113. The first surface 113 is a sensing surface. The conductive pad 112 is located on the first surface 113. The second surface 114 has a first through hole 115, such that the conductive pad 112 is exposed through the first through hole 115. The laser stopper 120 is located on the conductive pad 112 that is in the first through hole 115. The isolation layer 130 is located on the second surface 114 of the chip 110 and in the first through hole 115. The isolation layer 130 has a third surface 132 opposite to the second surface 114 of the chip 110. The isolation layer 130 has a second through hole 133, such that the laser stopper 120 is exposed through the second through hole 133. The redistribution layer 140 is located on the third surface 132 of the isolation layer 130, the sidewall of the second through hole 133, and the laser stopper 120 that is in the second through hole 133. The insulating layer 150 is located on the third surface 132 of the isolation layer 130 and the redistribution layer 140. The insulating layer 150 has an opening 152, such that the redistribution layer 140 is exposed through the opening 152. The conductive structure 160 is located on the redistribution layer 140 that is in the opening 152 of the insulating layer 150, such that the conductive structure 160 can be electrically connected to the conductive pad 112 through the redistribution layer 140 and the laser stopper 120. Moreover, the chip package 100 further includes a side isolation layer 121. The side isolation layer 121 is located on the sidewall of the first through hole 115 and between the laser stopper 120 and the chip 110. The side isolation layer 121 can prevent shorting between the laser stopper 120 and the chip 110 due to direct contact.

In this embodiment, the chip package 100 may be, but not limited to a finger print sensor or a RF sensor. The chip 110 may be made of a material including silicon. The laser stopper 120 may be made of a material including gold or copper, which may be formed by electroplating. The redistribution layer 140 be made of a material including copper, and also may be formed by electroplating. The isolation layer 130 may be made of a material including epoxy.

Figure 3:
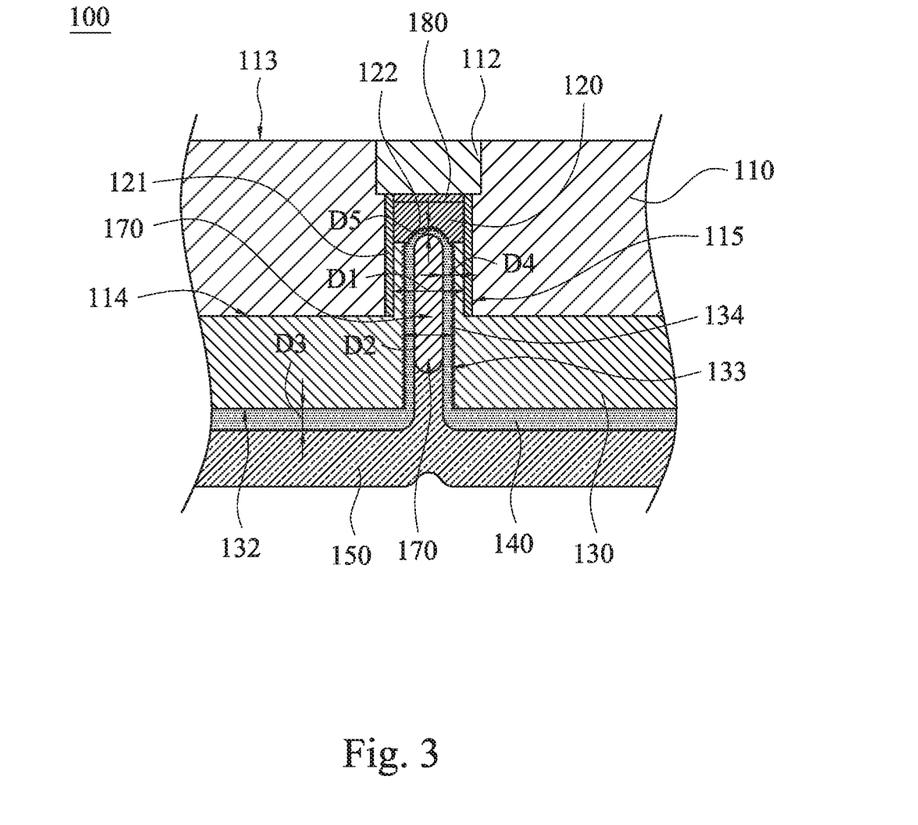
FIG. 3 is a partially enlarged view of the chip package shown in FIG. 2.

FIG. 3 is a partially enlarged view of the chip package 100 shown in FIG. 2. The laser stopper 120 has a fourth surface 122 that is concave and faces the redistribution layer 140. The second through hole 133 may be formed by utilizing a laser to penetrate the isolation layer 130. Through the use of the laser, the diameter D2 of the second through hole 133 is smaller than the diameter D1 of the first through hole 115, and such design is helpful to minimization. Since the second through hole 133 is formed by a laser, the sidewall 134 of the second through hole 133 and the fourth surface 122 of the laser stopper 120 are rough surfaces. The sidewall 134 of the second through hole 133 is a surface of the isolation layer 130 facing the second through hole 133.

The laser stopper 120 is located on the conductive pad 112. Hence, when a laser penetrates the isolation layer 130, the laser can be shielded by the laser stopper 120, and the second through hole 133 exposing the laser stopper 120 is formed in the isolation layer 130. After the second through hole 133 is formed, the redistribution layer 140 may be formed on the third surface 132 of the isolation layer 130, the sidewall 134 of the second through hole 133, and the laser stopper 120 that is in the second through hole 133 through electroplating and electroless plating, such that the redistribution layer 140 can be electrically connected to the conductive pad 112.

In addition, since the redistribution layer 140 is formed by electroplating, the thickness D3 of the redistribution layer 140 on the third surface 132 of the isolation layer 130 is greater than the thickness D4 of the redistribution layer 140 on the sidewall 134 of the second through hole 133, and the thickness D4 of the redistribution layer 140 on the sidewall 134 of the second through hole 133 is greater than the thickness D5 of the redistribution layer 140 on the laser stopper 120.

In this embodiment, the chip package 100 further has a cavity 170. The cavity 170 is between the insulating layer 150 and the redistribution layer 140 that is in the second through hole 133. The chip package 100 may further has a barrier layer 180. The barrier layer 180 is between the conductive pad 112 and the laser stopper 120. The barrier layer 180 is used to improve the adhesive force between the laser stopper 120 and the conductive pad 112. When the laser stopper 120 is made of a material including gold, the barrier layer 180 may be made of a material including nickel. When the laser stopper 120 is made of a material including copper, the barrier layer 180 may be made of a material including titanium.

In the following description, the manufacturing method of the chip package 100 will be described.

Figure 4:
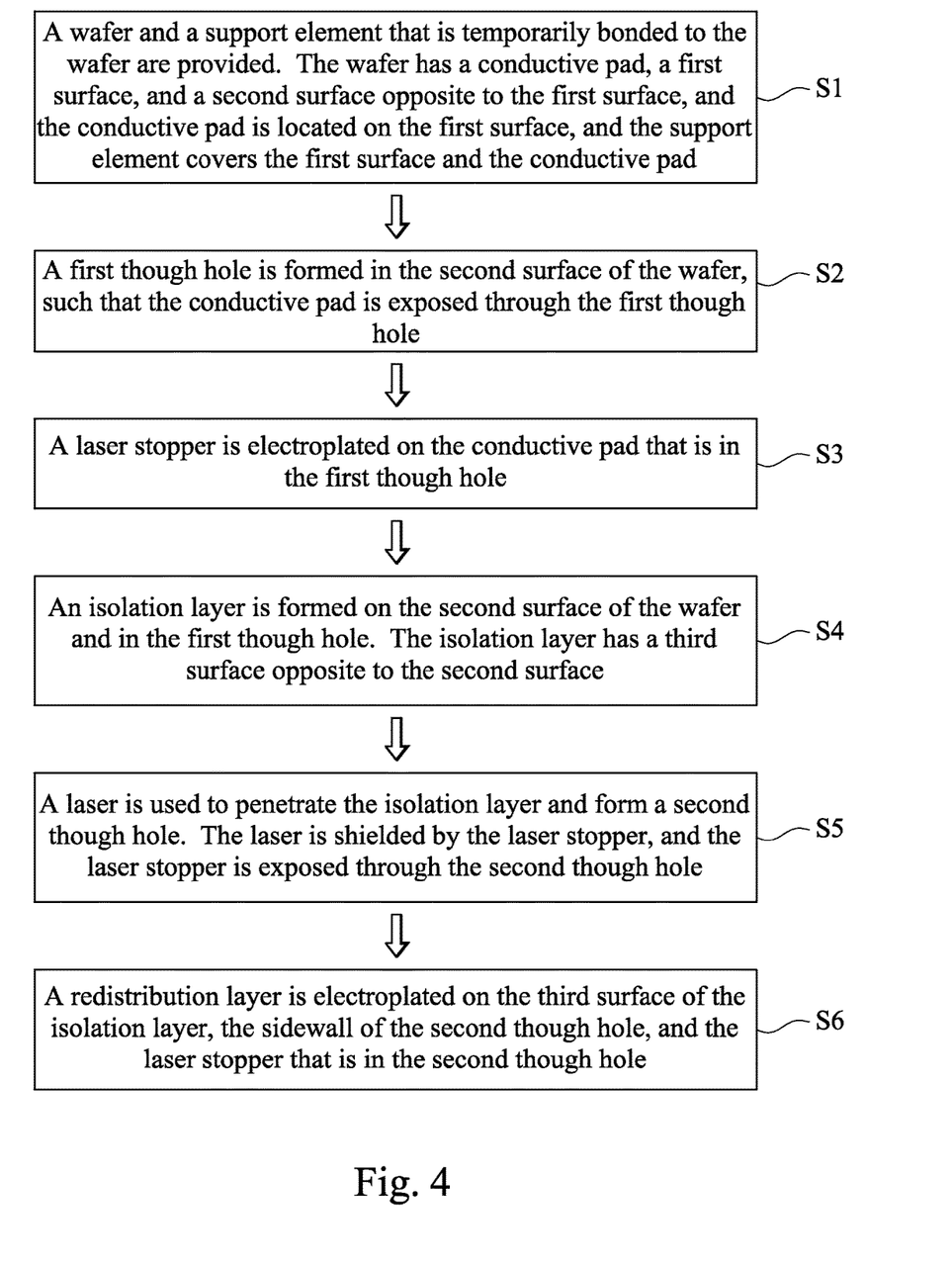
FIG. 4 is a flow chart of a manufacturing method of a chip package according to one embodiment of the present invention.

FIG. 4 is a flow chart of a manufacturing method of a chip package according to one embodiment of the present invention. The manufacturing method of the chip package includes the following steps. In step S1, a wafer and a support element that is temporarily bonded to the wafer are provided. The chip has a conductive pad, a first surface, and a second surface opposite to the first surface, and the conductive pad is located on the first surface, and the support element covers the first surface and the conductive pad. Thereafter in step S2, a first through hole is formed in the second surface of the wafer, such that the conductive pad is exposed through the first through hole. Subsequently in step S3, a laser stopper is electroplated on the conductive pad that is in the first through hole. Next in step S4, an isolation layer is formed on the second surface of the wafer and in the first through hole. The isolation layer has a third surface opposite to the second surface. Thereafter in step S5, a laser is used to penetrate the isolation layer and form a second through hole. The laser is shielded by the laser stopper, and the laser stopper is exposed through the second through hole. Finally in step S6, a redistribution layer is electroplated on the third surface of the isolation layer, the sidewall of the second through hole, and the laser stopper that is in the second through hole. In the following description, the aforesaid steps will be described.

Figure 5:
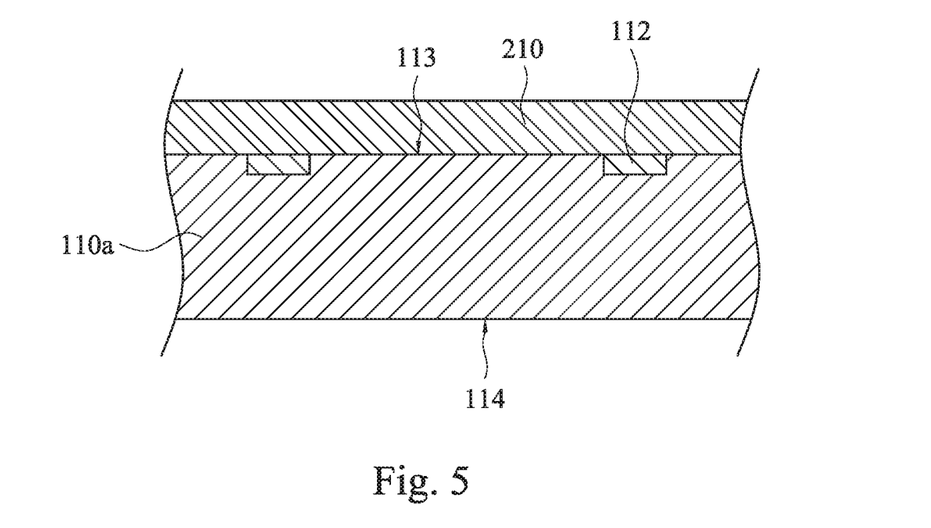
FIG. 5 is a cross-sectional view of a wafer and a support element according to one embodiment of the present invention.

FIG. 5 is a cross-sectional view of a wafer 110a and a support element 210 according to one embodiment of the present invention. The wafer 110a is a semiconductor substrate that may be cut to form plural chips 110 shown in FIG. 2. First of all, the wafer 110a and the support element 210 that is temporarily bonded to the wafer 110a are provided. The wafer 110a has the conductive pad 112, the first surface 113, and the second surface 114 opposite to the first surface 113. The conductive pad 112 is located on the first surface 113, and the support element 210 covers the first surface 113 and the conductive pad 112. The support element 210 can provide a supporting force for the wafer 110a, and prevents the wafer 110a from being cracked in the subsequent manufacturing process. After the support element 210 is bonded to the wafer 110a, the second surface 114 of the wafer 110a may be ground to reduce the thickness of the wafer 110a.

Figure 6:
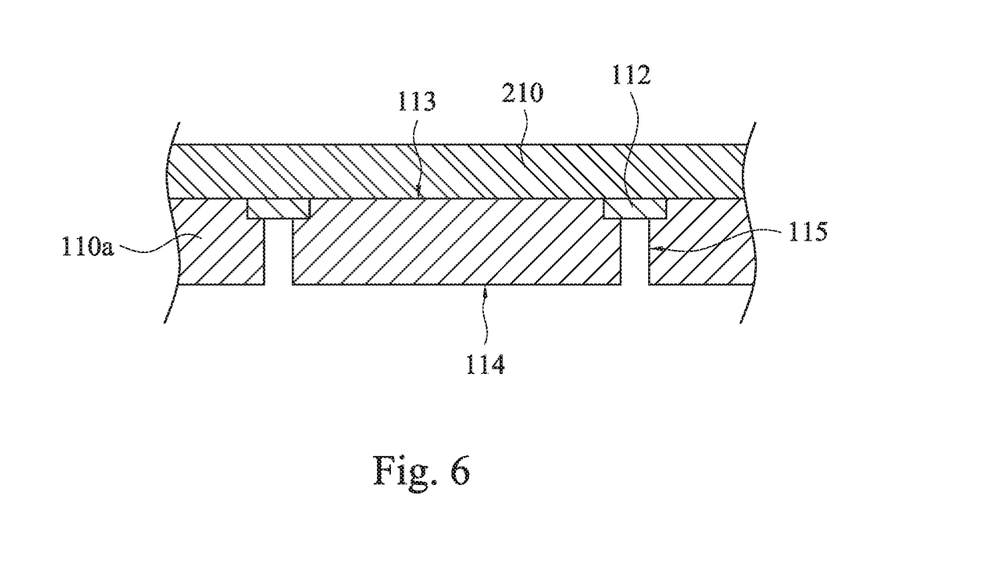
FIG. 6 is a cross-sectional view of a first through hole after being formed in the wafer shown in FIG. 5.

FIG. 6 is a cross-sectional view of the first through hole 115 after being formed in the wafer 110a shown in FIG. 5. As shown in FIG. 5 and FIG. 6, thereafter, the first through hole 115 may be formed in the second surface 114 of the wafer 110a, such that the conductive pad 112 is exposed through the first through hole 115. In this step, an etching process (e.g., a dry-etching process) may be performed on the wafer 110a to form the first through hole 115.

Figure 7:
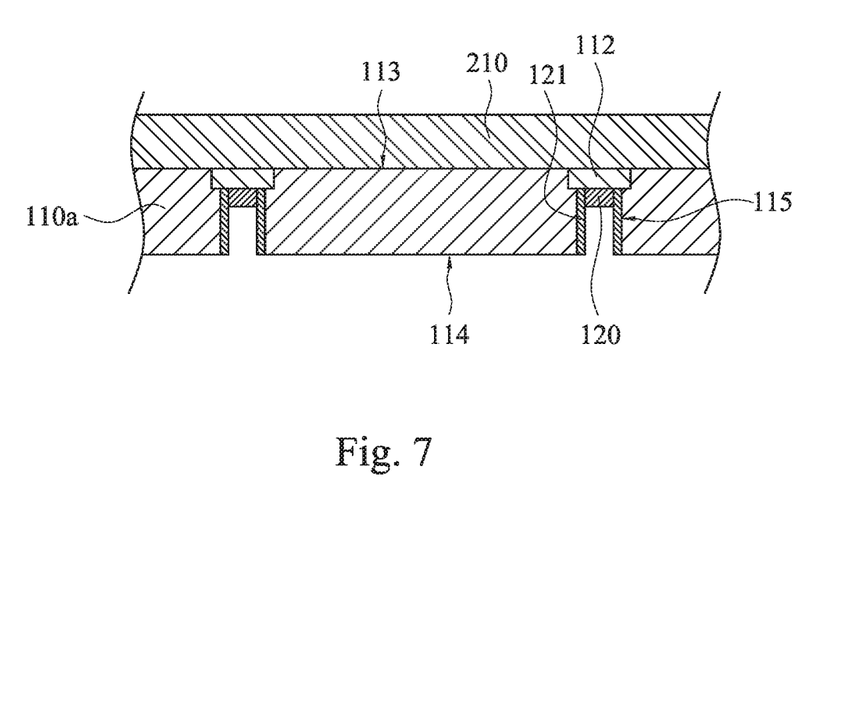
FIG. 7 is a cross-sectional view of a laser stopper after being formed on a conductive pad shown in FIG. 6.

FIG. 7 is a cross-sectional view of the laser stopper 120 after being formed on the conductive pad 112 shown in FIG. 6. As shown in FIG. 6 and FIG. 7, after the first through hole 115 is formed, the side isolation layer 121 may be formed on the sidewall of the first through hole 115. Afterwards, the laser stopper 120 is electroplated on the conductive pad 112 that is in the first through hole 115, such that the laser stopper 120 separates from the wafer 110a by the side isolation layer 121. Moreover, in order to improve the adhesive force between the laser stopper 120 and the conductive pad 112, the barrier layer 180 (see FIG. 3) may be electroplated on the conductive pad 112, and next the laser stopper 120 is electroplated on the barrier layer 180.

Figure 8:
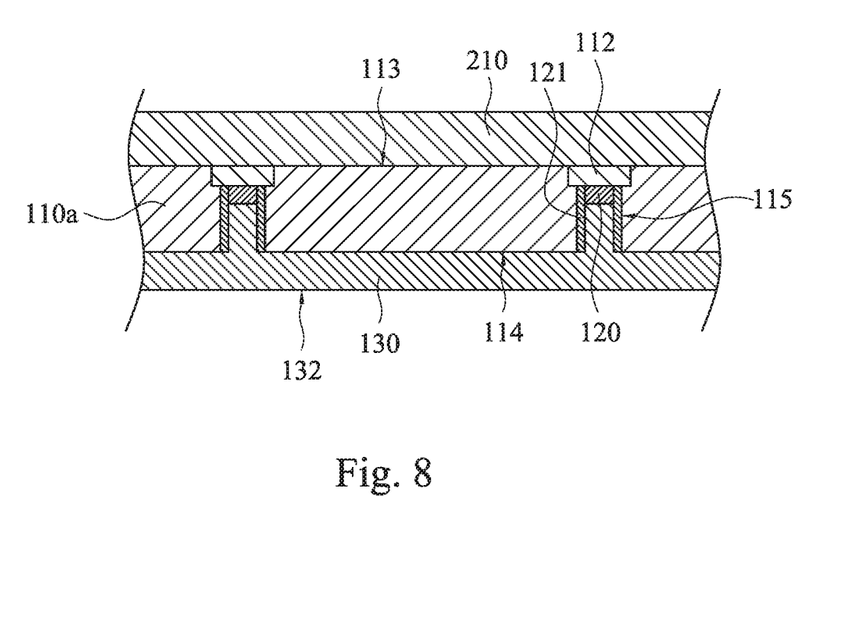
FIG. 8 is a cross-sectional view of an isolation layer after being formed on the second surface of the wafer and in the first through hole shown in FIG. 7.

FIG. 8 is a cross-sectional view of the isolation layer 130 after being formed on the second surface 114 of the wafer 110a and in the first through hole 115 shown in FIG. 7. After the laser stopper 120 is formed, the isolation layer 130 may be formed on the second surface 114 of the wafer 110a and in the first through hole 115. The isolation layer 130 has the third surface 132 opposite to the second surface 114. In this step, the isolation layer 130 may be formed on the second surface 114 of the wafer 110a and in the first through hole 115 by printing. Thereafter, designers may use a stamping process, a coating process, a molding process, or a grinding process to perform on the third surface 132 of the isolation layer 130, thereby reducing the thickness of the isolation layer 130.

Figure 9:
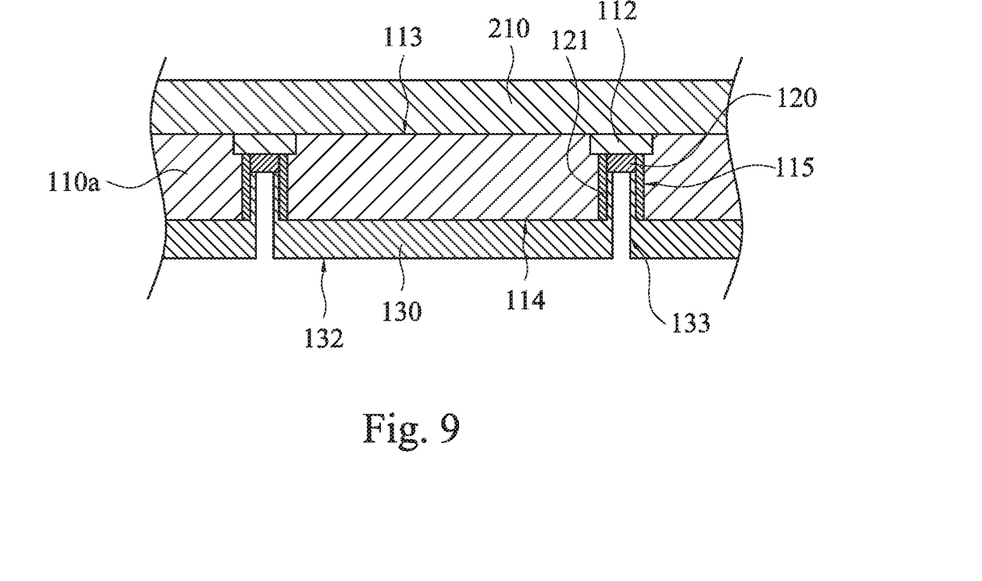
FIG. 9 is a cross-sectional view of a second through hole after being formed in the isolation layer shown in FIG. 8.

FIG. 9 is a cross-sectional view of the second through hole 133 after being formed in the isolation layer 130 shown in FIG. 8. As shown in FIG. 8 and FIG. 9, after the structure of FIG. 8 is formed, a laser may be used to penetrate the isolation layer 130 and form the second through hole 133. The laser may be shielded by the laser stopper 120, such that the laser stopper 120 is exposed through the second through hole 133. Furthermore, the laser is aligned with the first through hole 115 and the laser stopper 120 to irradiate, so that the second through hole 133 may be surrounded by the first through hole 115.

Figure 10:
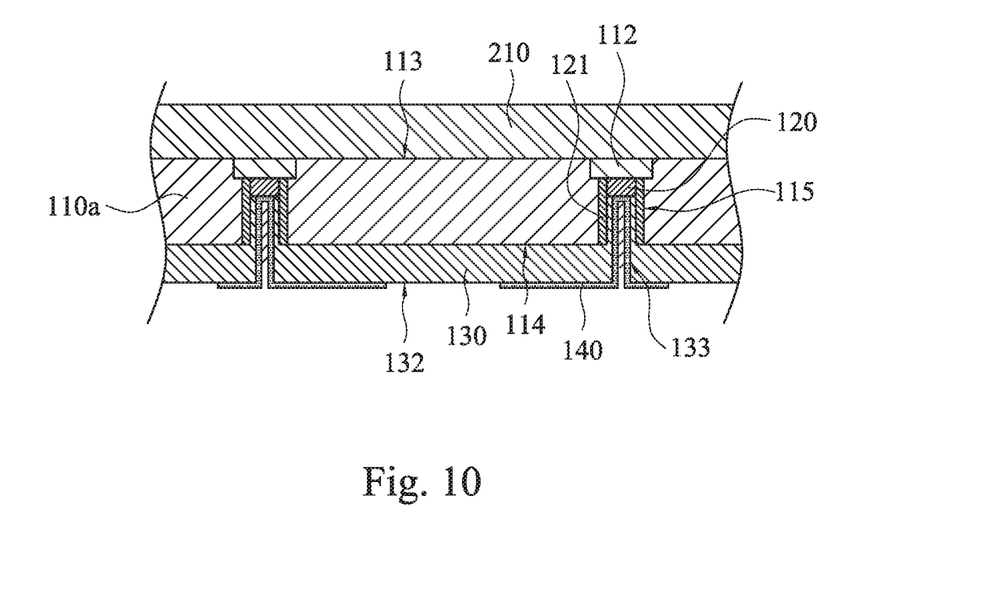
FIG. 10 is a cross-sectional view of a redistribution layer after being formed on the third surface of the isolation layer, the sidewall of the second through hole, and the laser stopper shown in FIG. 9.

FIG. 10 is a cross-sectional view of the redistribution layer 140 after being formed on the third surface 132 of the isolation layer 130, the sidewall of the second through hole 133, and the laser stopper 120 shown in FIG. 9. As shown in FIG. 9 and FIG. 10, after the second through hole 133 is formed in the isolation layer 130, the redistribution layer 140 may be electroplated on the third surface 132 of the isolation layer 130, the sidewall of the second through hole 133, and the laser stopper 120 that is in the second through hole 133.

Figure 11:
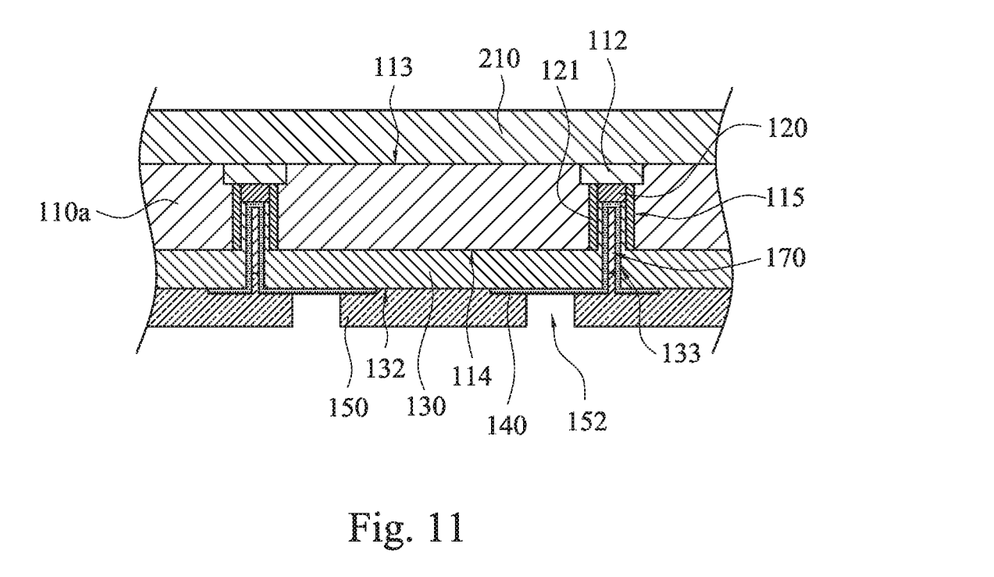
FIG. 11 is a cross-sectional view of an insulating layer after being formed on the isolation layer and the redistribution layer shown in FIG. 10.

FIG. 11 is a cross-sectional view of the insulating layer 150 after being formed on the isolation layer 130 and the redistribution layer 140 shown in FIG. 10. As shown in FIG. 10 and FIG. 11, after the structure of FIG. 10 is formed, the insulating layer 150 may be formed on the third surface 132 of the isolation layer 130 and the redistribution layer 140. Thereafter, the insulating layer 150 may be patterned to form an opening 152, such that a portion of the redistribution layer 140 can be exposed through the opening 152 of the insulating layer 150.

Figure 12:
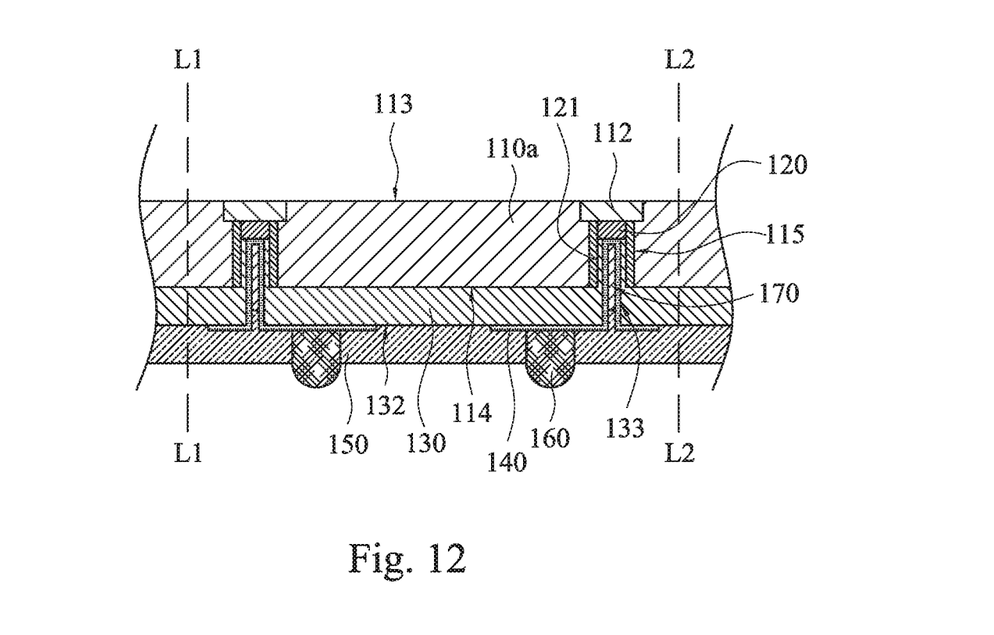
FIG. 12 is a cross-sectional view of a conductive structure after being formed on the redistribution layer shown in FIG. 11.

FIG. 12 is a cross-sectional view of the conductive structure 160 after being formed on the redistribution layer 140 shown in FIG. 11. As shown in FIG. 11 and FIG. 12, after the opening 152 of the insulating layer 150 is formed, the conductive structure 160 may be formed on the redistribution layer 140 that is in the opening 152, such that the conductive structure 160 may be electrically connected to the conductive pad 112 through the redistribution layer 140 and the laser stopper 120. After this step, the support element 210 that is on the first surface 113 of the wafer 110a may be removed.

Finally, the wafer 110a, the isolation layer 130, and the insulating layer 150 may be cut along lines L1-L1, L2-L2 to form the chip package 100 shown in FIG. 2.

The chip package and the manufacturing method thereof in the present invention can omit a typical chemical vapor deposition (CVD) process and a typical pattering process for the isolation layer, thereby saving process time and reducing the cost of equipments. Moreover, no additional process is performed on the first surface of the chip, so that the flatness of the first surface of the chip is good, and the detecting accuracy of the chip package can be improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A chip package, comprising:
   a chip having a conductive pad, a first surface, and a second surface opposite to the first surface, wherein the conductive pad is located on the first surface, and the second surface has a first through hole to expose the conductive pad;
   a laser stopper located on the conductive pad that is in the first through hole, and having a concave surface;
   an isolation layer located on the second surface and in the first through hole, and having a third surface opposite to the second surface, and having a second through hole to expose the concave surface of the laser stopper;

a redistribution layer disposed along the third surface of the isolation layer, a sidewall of the second through hole, and the concave surface of the laser stopper that is in the second through hole, such that at least one portion of the redistribution layer extends into the laser stopper;

an insulating layer located on the third surface and the redistribution layer, and having an opening to expose the redistribution layer; and a conductive structure located on the redistribution layer that is in the opening of the insulating layer, such that the conductive structure is electrically connected to the conductive pad.

2. The chip package of claim 1, wherein a diameter of the second through hole is smaller than that of the first through hole.

3. The chip package of claim 1, further comprising a cavity between the insulating layer and the redistribution layer that is in the second through hole.

4. The chip package of claim 1, wherein the sidewall of the second through hole is a rough surface.

5. The chip package of claim 1, wherein the concave surface of the laser stopper faces the redistribution layer and is a rough surface.

6. The chip package of claim 1, wherein a thickness of the redistribution layer on the third surface of the isolation layer is greater than a thickness of the redistribution layer on the sidewall of the second through hole.

7. The chip package of claim 1, wherein a thickness of the redistribution layer on the sidewall of the second through hole is greater than a thickness of the redistribution layer on the laser stopper.

8. The chip package of claim 1, wherein the isolation layer is made of a material comprising epoxy.

9. The chip package of claim 1, further comprising:
a barrier layer between the conductive pad and the laser stopper.

10. The chip package of claim 9, wherein the barrier layer is made of a material comprising nickel, and the laser stopper is made of a material comprising gold.

11. The chip package of claim 9, wherein the barrier layer is made of a material comprising titanium, and the laser stopper is made of a material comprising copper.

12. The chip package of claim 1, further comprising:
a side isolation layer located on a sidewall of the first through hole and between the laser stopper and the chip.

13. A manufacturing method of a chip package, comprising:
(a) providing a wafer and a support element that is temporarily bonded to the wafer, wherein the wafer has a conductive pad, a first surface, and a second surface opposite to the first surface, and the conductive pad is located on the first surface, and the support element covers the first surface and the conductive pad;

(b) forming a first through hole in the second surface of the wafer, such that the conductive pad is exposed through the first through hole;

(c) electroplating a laser stopper on the conductive pad that is in the first through hole;

(d) forming an isolation layer on the second surface of the wafer and in the first through hole, wherein the isolation layer has a third surface opposite to the second surface;

(e) using a laser to penetrate the isolation layer and form a second through hole, wherein the laser is shielded by the laser stopper, and the laser stopper has a concave surface that is exposed through the second through hole; and (f) electroplating a redistribution layer on the third surface of the isolation layer, a sidewall of the second through hole, and the concave surface of the laser stopper that is in the second through hole, such that at least one portion of the redistribution layer extends into the laser stopper.

14. The manufacturing method of the chip package of claim 13, further comprising:
forming an insulating layer on the third surface of the isolation layer and the redistribution layer; and
patterning the insulating layer for forming an opening, such that the redistribution layer is exposed through the opening.

15. The manufacturing method of the chip package of claim 14, further comprising:
forming a conductive structure on the redistribution layer that is in the opening of the insulating layer.

16. The manufacturing method of the chip package of claim 14, further comprising:
cutting the wafer, the isolation layer, and the insulating layer for forming the chip package.

17. The manufacturing method of the chip package of claim 13, further comprising:
grinding the second surface of the wafer.

18. The manufacturing method of the chip package of claim 13, wherein step (d) comprises:
printing the isolation layer on the second surface of the wafer and in the first through hole.

19. The manufacturing method of the chip package of claim 13, further comprising:
stamping, coating, molding, or grinding the third surface of the isolation layer.

20. The manufacturing method of the chip package of claim 13, further comprising:
removing the support element that is on the first surface of the wafer.

21. The manufacturing method of the chip package of claim 13, further comprising:
electroplating a barrier layer on the conductive pad.

22. The manufacturing method of the chip package of claim 13, further comprising:
forming a side isolation layer on a sidewall of the first through hole.

* * * * *